US011048919B1

(12) United States Patent
Modolo et al.

(10) Patent No.: US 11,048,919 B1
(45) Date of Patent: Jun. 29, 2021

(54) PERSON TRACKING ACROSS VIDEO INSTANCES

(71) Applicant: Amazon Technologies, Inc., Reno, NV (US)

(72) Inventors: Davide Modolo, Seattle, WA (US); Hao Chen, Kirkland, WA (US); Enrica Maria Filippi, Seattle, WA (US); Stephen Gould, Seattle, WA (US); Camille Claire Le Men, Seattle, WA (US); Andrea Olgiati, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 15/993,222

(22) Filed: May 30, 2018

(51) Int. Cl.
*G06K 9/00* (2006.01)
*H04N 7/18* (2006.01)

(52) U.S. Cl.
CPC ..... *G06K 9/00295* (2013.01); *G06K 9/00369* (2013.01); *G06K 9/00765* (2013.01); *G06K 9/00771* (2013.01); *H04N 7/181* (2013.01)

(58) Field of Classification Search
CPC ........... G06K 9/00718; G06K 9/00711; G06K 9/00744; G06K 9/6267; G06K 2209/01; G06K 2209/25; G06K 9/00724; G06K 9/6256; G06K 9/6274; G06K 9/00771; G06K 9/6878; G06K 2009/00738; G06K 9/00765; G06K 9/00288; G06K 9/00228; G06K 9/00281

USPC ......................................................... 382/103
See application file for complete search history.

(56) References Cited

U.S. PATENT DOCUMENTS

| 2013/0216094 A1* | 8/2013 | DeLean ............. G06K 9/00335 382/103 |
| 2014/0347475 A1* | 11/2014 | Divakaran ......... G06K 9/00771 348/135 |
| 2016/0335502 A1* | 11/2016 | Roshtkhari ........ G06K 9/00771 |

* cited by examiner

*Primary Examiner* — Ajibola A Akinyemi
(74) *Attorney, Agent, or Firm* — Hogan Lovells US LLP (57) ABSTRACT

People can be tracked across multiple segments of video data, which can correspond to different scenes in a single video file, or multiple video streams or feeds. An instance of video data can be broken up into segments that can each be analyzed to determine faces and bodies represented therein. The bodies can be analyzed across frames of the segment to determine body tracklets that are consistent across the segment. Associations of faces and bodies can be determined based using relative distances and/or spatial relationships. A subsequent clustering of these associations is performed to attempt to determine consistent associations that correspond to unique individuals. Unique identifiers are determined for each person represented in one or more segments of an instance of video data. Such an approach enables individual representations to be correlated across multiple instances.

20 Claims, 7 Drawing Sheets

PERSON TRACKING ACROSS VIDEO INSTANCES

BACKGROUND

An ever-increasing amount of video data is being transmitted and stored electronically. While it is desirable to attempt to index this video data in such a way as to be able to identify objects, people, or places represented in the video data, it is impractical at best to attempt to manually identify the contents of each instance of video data, particularly where there may be many different scenes in a video file that each include representations of different persons, places, or things. While technologies exist that are able to identify people or objects in image or video content, some of these technologies do not work for unidentified people, while other technologies do not provide for tracking of these people across different scenes or feeds of video content.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the recognition of persons represented in video content. In particular, various embodiments enable persons to be tracked across multiple segments of video data, where those segments can correspond to different scenes in a single video feed or file, or multiple video feed or files, among other such options. In various embodiments, an instance of video data can be broken up into multiple chunks or segments. Each segment can be analyzed to determine faces and bodies represented in frames of the video segment. The bodies can be analyzed across frames of the segment to determine body tracklets that are consistent across at least a portion of the segment. Associations of the various faces and bodies can be determined based on, for example, their relative distances and/or spatial relationships. Another clustering operation of these associations can be performed over a given segment, or across segments, to attempt to determine consistent associations that correspond to unique individuals. Unique identifiers can then be determined for each person represented in one or more segments of an instance of video data. Such an approach also enables the representation of that individual to be correlated across the various instances, such as across different scenes or video streams.

Various other functions can be implemented within the various embodiments as well, as discussed and suggested elsewhere herein.

Figure 1A:
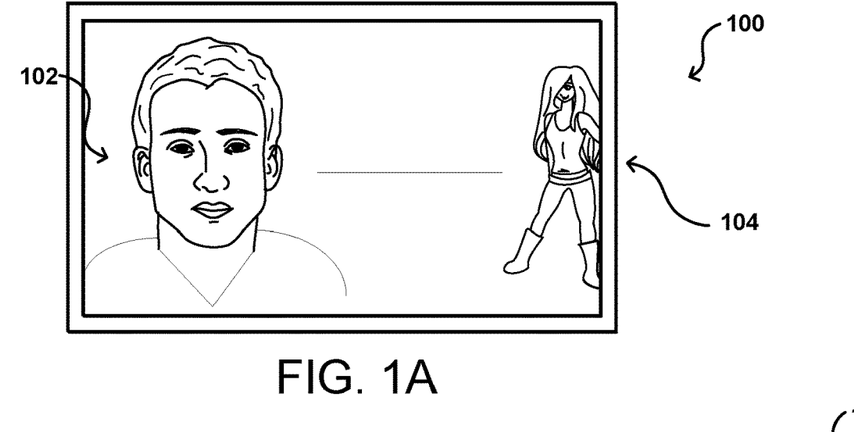
FIGS. 1A, 1B, 1C, and 1D illustrate the automated detection of faces and bodies in two different frames of video content that can be performed in accordance with various embodiments.

FIG. 1A illustrates an example frame 100 of video content that can be received by a system or service in accordance with various embodiments. As illustrated, the frame includes at least partial representations of two people 102, 104. There might be a number of different reasons why it might be desirable to determine either an identity of the people in the video, or at least track the presence or movement of the person throughout multiple feeds or segments of video. For media providers, it might be desirable to be able to identify as many instances of video content as possible that include a particular person or actor, such as where customers might search for video containing a specific person. For security settings, it might be desirable to track the movement or presence of people over time across video feeds from multiple cameras. Various other reasons or uses exist as well as would be apparent to one of ordinary skill in the art in light of the teachings and suggestions contained herein.

For at least some of these applications, it may be desirable to be able to recognize or identify people represented in video content with high precision, even without any a-priori knowledge of the identity of the persons represented. This might be the case for a live feed of video where the people represented may not be predetermined, or for content received from a provider or source that does not include such information. It may be desirable to be able to identify each distinct and salient person represented in the video content, as well as to be able to track that person across multiple instances of video content, where across different scenes or shots of a single video file or stream, or across multiple video files or streams, which may be obtained from multiple sources. In some embodiments it may be desirable to assign a unique identifier (ID) to each person that can be used across one or more video files or streams, whether or not the actual identity of the person can be determined or is known.

Certain conventional approaches can perform face detection on frames of video content, or can perform tracking of objects using optical flow or other such techniques. As mentioned, such approaches do not provide for person tracking across different video streams, and often suffer from identity switching problems when the people represented in the video cross in front of each other or otherwise change positions in a way that causes problems for the object tracker. There can also be issues with identity duplications, or multiple identifiers being assigned to the same person, when there are fast scene changes, occlusions, or other issues in the video content. Some conventional solutions that rely on face recognition will work with only limited results, as sometimes a person's face will not be visible in a scene, or will only be partially visible such that the recognition will lack sufficient confidence in the determination. The accuracy of various facial recognition techniques can also degrade relatively quickly, which can lead to identification problems when the faces that are detected are too small or heavy occluded, blurred, or rotated, etc.

Approaches in accordance with various embodiments attempt to leverage various detection algorithms to detect aspects, such as faces and bodies, of persons represented in video content. Various association, clustering, and/or machine learning algorithms can be utilized to process the output of these detection algorithms to achieve precise person recognition that works across scene changes and video streams, among other such differences in video content. In one embodiment, a person recognition system includes a body tracker and a face recognition component. An association algorithm is used to process the detected bounding boxes for the faces and the bodies in one or more segments of video content, and calculate body-face associations along with their associated confidences. The association algorithm, or a component receiving the output of the association algorithm, can generate a new feature vector (or other source or object of information) for each body-face pair using the face embedding and person tracklet data from the detection algorithms. These feature vectors can then be clustered into unique identities in a way that discards inconsistent pairings, combines pairings for the same individual, and splits pairings where there are two or more consistent pairings, among other such options. The output identities can then be used to track or determine the presence of that unique person across scenes or shots of a single video feed or file, or across multiple feeds or files, etc.

Figure 1B:
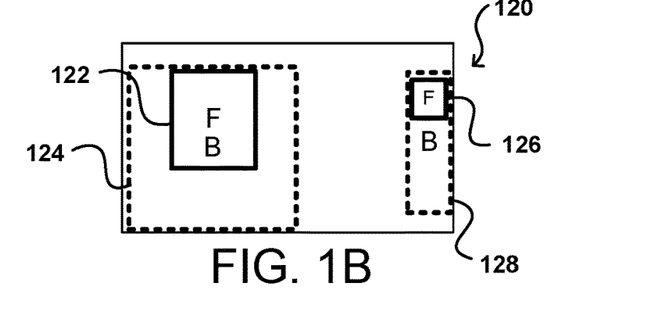

Referring again to the video frame 100 of FIG. 1A, the frame can be analyzed using a face detection algorithm and a body detection algorithm to determine regions of the video frame that likely correspond to a face or body of a person. The example image map 120 of FIG. 1B illustrates regions of the image frame that were identified to likely contain faces (F), and those that likely contain bodies (B), where in at least some embodiments a "body" includes the entire representation of a person, including the head and face regions. Various facial detection, object detection, computer visions, and other such approaches and algorithms can be used to make such determinations as known or used in the art for such purposes. In this example the faces 122, 126 and bodies 124, 128 for the people 102, 104 are represented by bounding boxes, although other representations can be used as well, such as vectors, models, points, and the like.

Figure 1C:
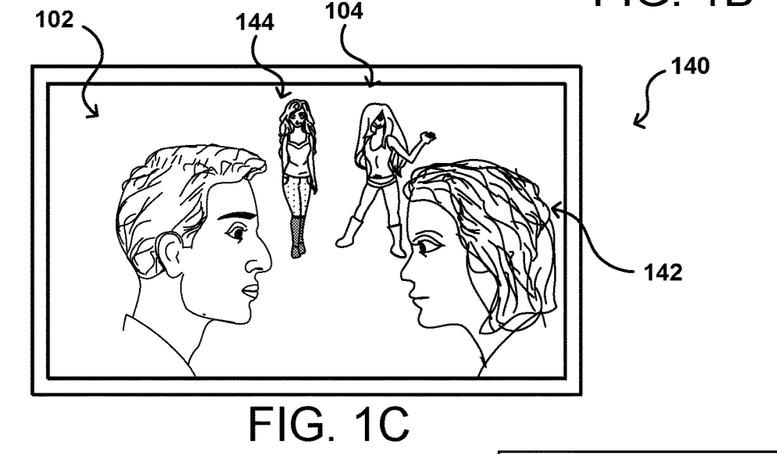
Figure 1D:
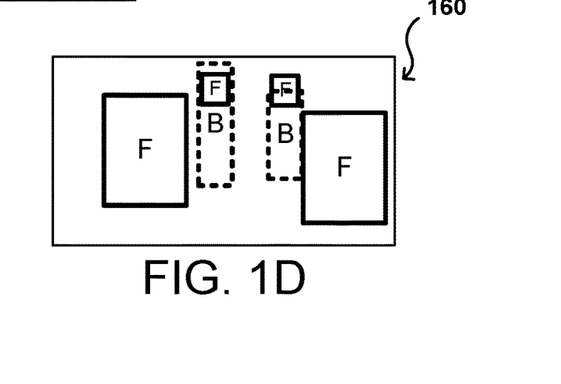

FIG. 1C illustrates another example frame 140 of video content, which may be from the same scene or a different scene of the same video feed or file, or may be from a different video feed or file in accordance with various embodiments. A similar process can be performed on this video frame to recognize portions of people 102, 104, 142, 144 represented in the video frame, some of which were also represented in the video frame of FIG. 1A. As illustrated in the example image map 160 of FIG. 1D, the faces and bodies (or at least the recognizable portions) of those persons can be determined using the various detection approaches. If the persons are in the same scene or shot in the frames of FIGS. 1A and 1C then the faces and bodies of the people may be tracked for correlation using existing techniques, although subject to potential switching and other problems as discussed herein. If the frames of video content of FIGS. 1A and 1C are from different feeds or files, however, and there is no identifying information provided with the video data, then existing approaches may not be able to accurately identify and correlate the people represented in both video frames.

Figure 2A:
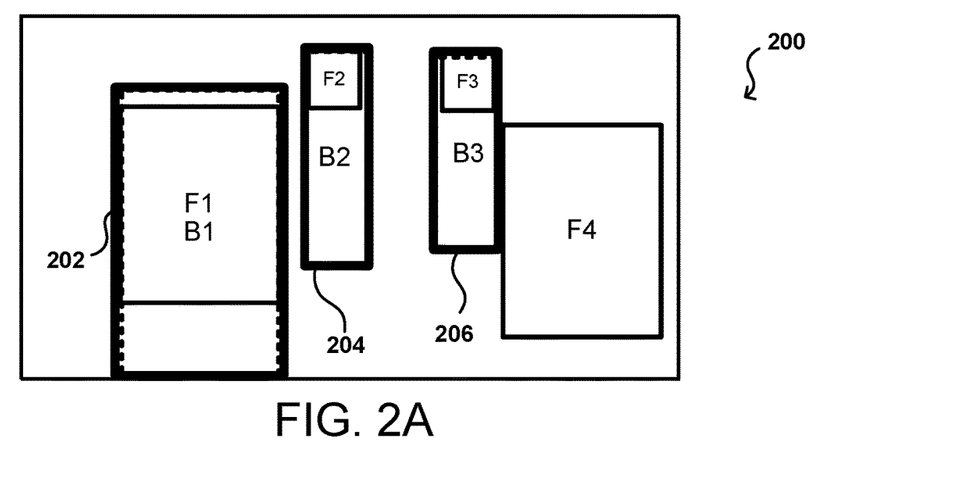
FIGS. 2A, 2B, 2C, and 2D illustrate an example approach to analyzing face-body associations over time that can be utilized in accordance with various embodiments.

Approaches in accordance with various embodiments attempt to recognize people in a way that enables their representations to be correlated across different video scenes, shots, segments, files, feeds, or other groupings of video content. The example image map 200 of FIG. 2A illustrates part of such an approach that can be utilized in accordance with various embodiments. As mentioned, one or more facial detector algorithms and body detection algorithms can be used to identify face and body representations in a frame of video, as illustrated by the corresponding bounding boxes. In this example, an association algorithm is used to correlate faces to bodies based upon factors such as location, orientation, size, and/or scale. For example, a first association 202 can be determined for a first pair of a recognized face F1 and body B1 based on their relative location and scale in the video feed. Similar associations 204, 206 can be determined for other face-body pairs in the frame as well. One of the faces F4 does not have a body associated, which may be due to factors such as the body being obscured, located out of frame, or otherwise being unable to be recognized with sufficient confidence. In some embodiments a sufficiently accurate face identification may not require an associated body for person tracking, particularly where an identity of the person can be determined. In some embodiments the association can be performed using a clustering algorithm. For example, pairings of faces and bodies may be clustered together based on proximity to generate potential matches. In some embodiments, the body determinations may also be clustered over time, such as for the duration of a given video segment, in order to generate a set of (what are referred to herein as) body tracklets. The use of body tracklets for a video segment, as opposed to individual frame-based detections, can help to more accurately recognize individual body representations, which can improve the accuracy of the face-body associations. In at least some embodiments the faces can be clustered as well to generate a set of face groupings, which can also be grouped across time and streams in some embodiments.

Figure 2B:
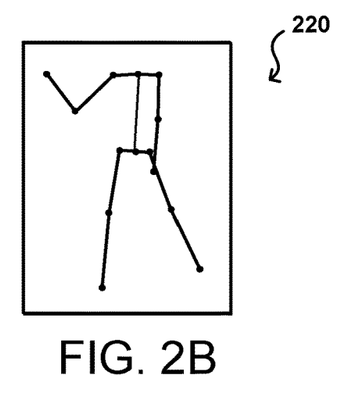
Figure 2C:
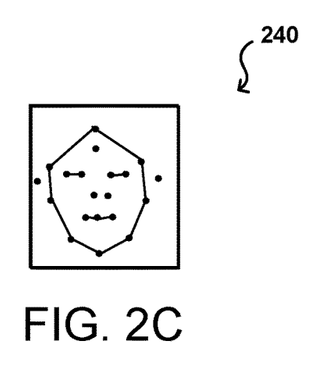

The detection of faces and bodies can be based upon any features or visual aspects of the video data as known for such detection. For example, as illustrated in the example image 220 of FIG. 2B, a set of feature points might be determined that match a pattern for a human body. This can be improved by analyzing the body over time, as movement of the body can help determine different feature points and their relationships, which can help to improve pattern recognition. Machine learning and other approaches can be used to recognize the presence of bodies in video content based on any of these and other features as well within the scope of the various embodiments. Similarly, as illustrated in the example image 240 of FIG. 2C, feature points may be identified in a video frame that match a pattern or model for a human face. The recognition of the feature points corresponding to the patterns or models can be used to generate the bounding boxes or other region determinations as illustrated. A similar process can be used to generate the face and body determinations for the image map 260 of FIG. 2D, as well as the associations of faces to body determinations.

As mentioned, in some embodiments feature vectors can be generated for the detected faces and bodies based at least in part upon the identified features and their spatial relationships. The associations or pairings of faces and bodies (or body tracklets) can be used to generate new feature vectors that are combinations, or at least based on, the individual face and body vectors. The associations can take into account the relative likelihood of the various combinations in order to determine the appropriate associations. In the event that a face may potentially match more than one body, or vice versa, two separate associations can be generated that can then be analyzed in a subsequent step of the process. As illustrated in the image of FIG. 2D, face F1 is again associated with body B1, but in this frame a new face F5 is associated with body B3.

Figure 2D:
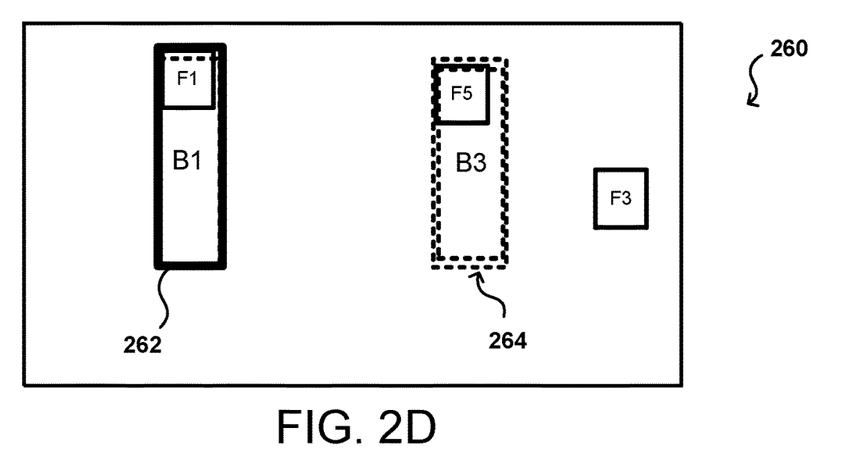

In order to reconcile such differences, a subsequent step in the process can perform a second clustering or association using the generated feature vectors for the associations over time, such as over the length of a video segment. Clustering over time can look at aspects such as the amount of time in which a face and body are associated, as well as frames for which the face and body are not associated due to, for example, a significant distance between the face and body representations. If a face and body are determined to be unassociated for at least a portion of a segment, then that association can be discarded for consideration for the segment. In the example of FIGS. 2A and 2D, body B3 is associated with two faces F3 and F5, such that the association of that body with one of those faces will only persist if the confidence of that association is sufficiently high and no other associations of higher confidence make this one inconsistent, or if the confidence of the related associations in other frames are high. In this example, the second clustering over the segment would likely result in the pairing of F1 and B1 being confirmed, and an identifier output indicating a presence of an associated person in the video segment. Based on the content of the other frames of the segment, however, body B3 would at most be associated with one of faces F3 or F5, and possibly neither if at least one confidence criterion cannot be satisfied for the segment, such as the association being determined for a minimum portion of the segment or with at least a second minimum confidence for at least one frame of the segment, etc. In some embodiments machine learning is utilized to look at ratios and other factors to attempt to determine consistencies throughout a video segment. There can also be additional clustering or unclustering during this stage of the process, in order to determine the final associations and uniquely identified people represented in a given video segment.

In some embodiments the clustering can involve an association of groupings (face or body) looking at the minimum distances, such as may involve a KNN nearest neighbors analysis. Distances between the various groupings can be models in both space and time as features, or feature vectors, and the minimum distance determined. In at least some embodiments a semantic meaning will be extracted from the body and face detectors, which can include vectors or other representations of how the content varies across time, frames, and/or feeds. Another example clustering vector can indicate a plausibility of the spatial association between a body and face, as well as the plausibility of matching faces across frames, as there may be rules for the associations based upon the physical constraints of the human body. In some embodiments these two representations can be generated and used to determine a strength of the association for clustering purposes. Some embodiments can then apply a linear regression to these representations, using defined thresholds or criteria, to determine valid associations in time and space for a single individual. The associations having at least a minimum confidence or certainty can then be output from the process as stable and consistent representations of single entities.

In some embodiments the distance metrics can be adjusted or tuned as appropriate. In some embodiments machine learning can be used to adjust the metrics over time. Proposals for the individual distances can be generated and combined, with a homogeneity and/or completeness analysis being run on the various clusters. Clusters having positive results from those analyses can be retained. The thresholds for homogeneity can be adjusted or adapted over time as well. In one example it may be determined that a minimum threshold of 80% of the candidates must correspond to the same identity before that association or cluster is confirmed, with outliers being disassociated from the cluster. Clusters with the same sets of values or vectors (e.g., triplets) can be combined into a single cluster, while clusters that appear to consistently have two triplets can be separated. Various other clustering approaches can be used as well within the scope of the various embodiments. As mentioned, machine learning can be used to improve the accuracy of the clustering, such as by utilizing a rules-based approach or a direct learning approach, which may involve clustering on large feature vectors instead of individual vectors, etc.

As mentioned, the video content can be divided into a number of segments or chunks of appropriate size, such as may correspond to twenty or thirty seconds of video content if played at normal speed through a video player. The consistency may be for the duration of a segment, with individual determinations being made for each segment. The identifiers for individuals from the various segments can then be analyzed to determine the presence of an individual in the respective scenes, shots, or feeds, etc. The information collected, such as may include embeddings of compressed face data, compressed body data, and association data, can be compared against information stored for a set of people in a repository, or other location, to attempt to determine the identity of the person determined to be represented in the video content as well. One or more similarity criteria can be applied for the determinations. In some embodiments a lower confidence threshold might be applied to a similarity of all three values than would be applied for a single value, such as for just a face vector. There may also be different confidence or similarity thresholds used for the different values, as a body value that might be similar between people might require a higher similarity than a face value, which may be relatively unique for different people. Different thresholds also might be applied if only a face or body is recognized in a segment, without a determined association.

Figure 3:
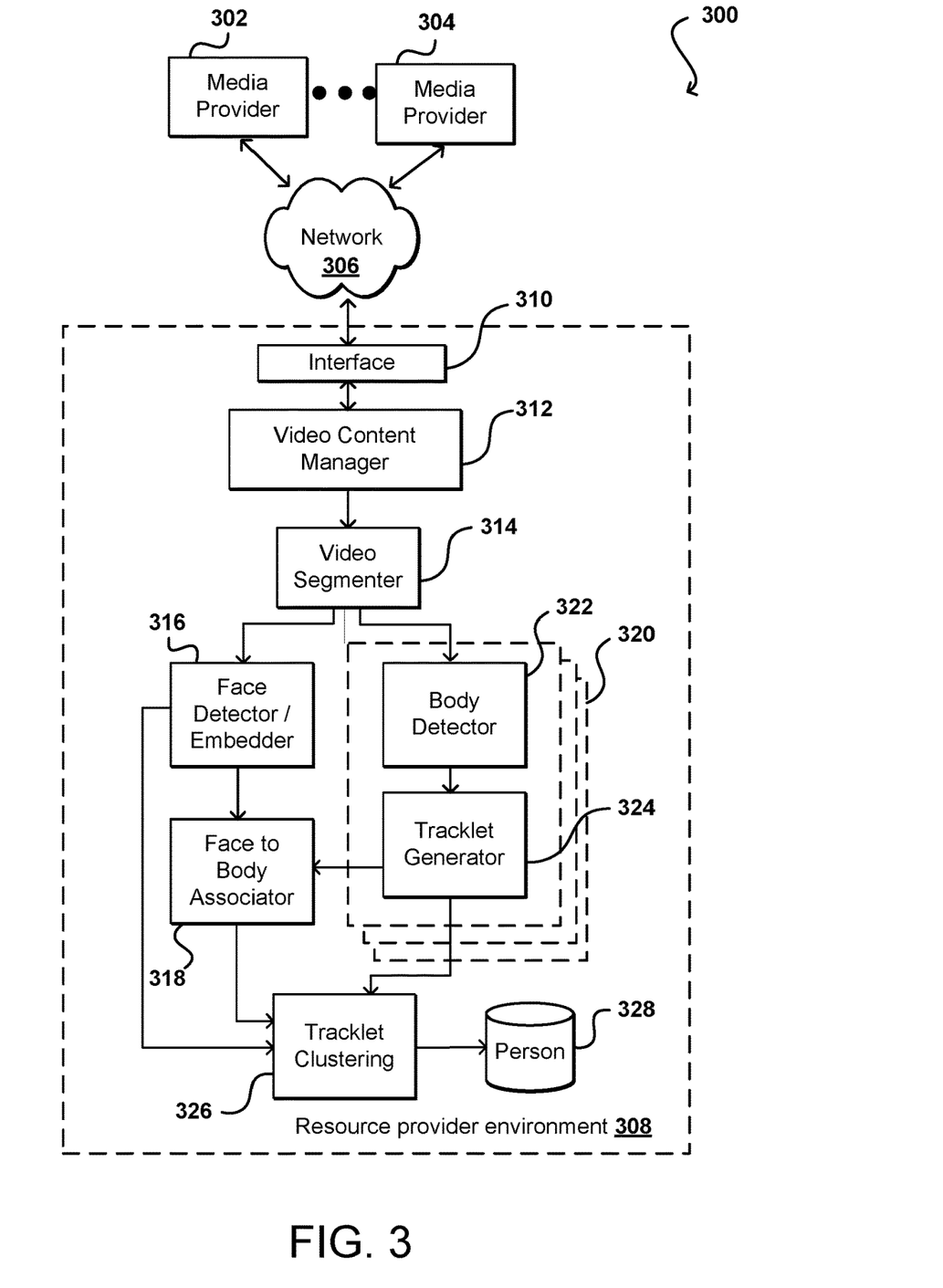
FIG. 3 illustrates an example system for identifying people represented in video content that can be utilized in accordance with various embodiments.

FIG. 3 illustrates an example system 300 that can be utilized to implement aspects of the various embodiments. In this example, there can be multiple media providers 320, 304 or other such sources from which content is obtained. These can be different entities, such as users or broadcasters, or different media sources, such as different cameras or surveillance systems, among other such options. In this example, media content including video is transmitted across at least one network 306, such as the Internet or a local area network, and received to an interface layer 310 of a resource provider environment. A provider of the environment 308 may also be associated with at least one of the media providers in various embodiments, such that a network external to the resource provider environment may not be utilized. The video content can be received to the interface layer 310 then directed to a video content manager 312, or other such system or service, for processing.

As part of the processing of the incoming media content, at least a video portion of the content can be passed to a video segmenter 314 to divide the video content into segments, or chunks, for analysis. In some embodiments the video content may be placed into a queue until such time as the segmenter has capacity to process the video content. As mentioned the segments can correspond to any appropriate size or playback length of the video content. The segments output from the segmenter 314 can be placed in one or more additional queues (not shown) for parallel processing by different processing pipelines. A first pipeline includes a face detector 316, which can also function as an embedder in some embodiments. The face detector can analyze each frame of video content (or a subset of those frames) to attempt to recognize faces represented in the frame. As mentioned, the faces may not be available frame-by-frame, so the face information will be extracted where available. In at least some embodiments aspects other than, or in addition to, faces can be used as well, such as may include clothing or other information that can be associated to a body and used for consistency determinations and the like. The collection of determined faces can be categorized based at least in part upon their embeddings from the facial recognition algorithm. In this example a feature vector can be generated for each detected face, enabling vectors to be grouped by proximity, as discussed elsewhere herein, in a stateless manner. Since the faces may not be present in every frame, the grouping of face vectors by proximity and similarity will produce more accurate results than using a process such as optical flow, which generally requires at least some representation of an object in adjacent frames for tracking.

In a second, parallel pipeline the video segments are directed to one of a set of processing components 320, such as virtual machines or other processing instances, that each include a body detector, such as single shot multibox detector (SSD), that can detect objects in frames of video content using, for example, a deep neural network. An example SSD approach can output a set of bounding boxes indicating regions where specific types of items were detected with at least a minimum confidence or certainty. An example body detector can analyze unique features or histograms of the video data, for example, and attempt to identify regions that correspond to human bodies. A process such as optical flow can be used to analyze the locations of those objects frame by frame, in order to track boxes that belong to the same body, with the location of the bounding box for a body over time being used by a component such as a tracklet generator 324 to generate a tracklet for each detected body. An optical flow process can attempt to determine a pattern of motion of the bounding boxes, or other body representations, over the video data of the segments, such as by analyzing surfaces, points, or edges in the data. A tracklet can generally refer to at least a portion of a track or path of motion followed by a moving object, here as determined using a computer vision or object recognition process. The tracklet generator 324 in some embodiments can take the body detection data for each frame of video and determine the path of motion over the duration of the video segment. It should be mentioned that "frames" of video content are used as an example for purposes of explanation, but other segments or portions of video data can be used as well, each of which may correspond to the appearance of the video content at a specified point in time upon playback or display. The combining of the bounding boxes or embeddings for a given body into a tracklet can also utilize a clustering approach in some embodiments. The generation of the tracklets for the bodies can be performed using an optical flow technique that is consistent in time as well as aspect ratio or other such factor(s).

The face detection data from the face detector 316 and the body tracklets from the tracklet generator 324 can be provided to a face to body associator 318 or other such component. The face to body associator can include an algorithm or process for generating associations between the detected faces and body tracklets. This can include, for example, determining the distance and orientation of the faces and body tracklets with respect to each other, and generating a likelihood or other such score for each potential pairing. If there are no associations for a face or body that satisfy at least the minimum confidence criterion then no association may be provided for that face or body for that frame or video segment. This can be performed for any or all frames in the segment in which a face or body tracklet was detected. As mentioned, however, there may be some instances where the same face may be associated with two or more tracklets because the process is unable to track consistently beyond scenes or shots, or across feeds. Accordingly, the associations from the face to body associator 318 can be provided to a tracklet clustering component 326 or process, which can perform an additional clustering of the associations in order to attempt to confirm the associations across various shots, scenes, feeds, or other instances of video content. An example clustering algorithm used by a tracklet clustering component 326 can apply distance reasoning over time and instances to attempt to ensure consistency of the associations. Various rules can be applied to the association clusters to confirm the various associations, and group or split the associations as appropriate. As illustrated, the tracklet clustering component 326 can also receive the face data from the embedder 316 and the tracklets from the tracklet generator 324 for use in the analysis with the association data. Once the final associations are determined, the output of the tracklet clustering component 326 can be one or more unique identities or identifiers for the people identified in the video segment(s), which can then be stored to a person data repository 328 or other such location. The person data repository in some embodiments can store information for people identified in different video feeds, streams, files, segments, scenes, etc.

Other data from the media file or feed can be used as well in various embodiments. For example, the file might include voice data enabling an identity or one or more persons represented in the media file to be determined. Similarly, metadata for the file might indicate, or point to, identify information for such persons. While this data may not be able to be associated with specific people or bodies in a given frame, it can help to determine, or at least increase confidence in determinations of, the appropriate person information, both within a feed or files as well as across different feeds or files. As mentioned, representative face and body vectors may be stored for specific individuals, and this information can be pulled from the person data repository 328 in some embodiments to help with face and body detections and associations. Another advantage of such a system is that it allows for failures of detections and associations, and data such as the face data and data from other segments can be used to correct mistakes determined for other segments or feeds, etc.

Figure 4:
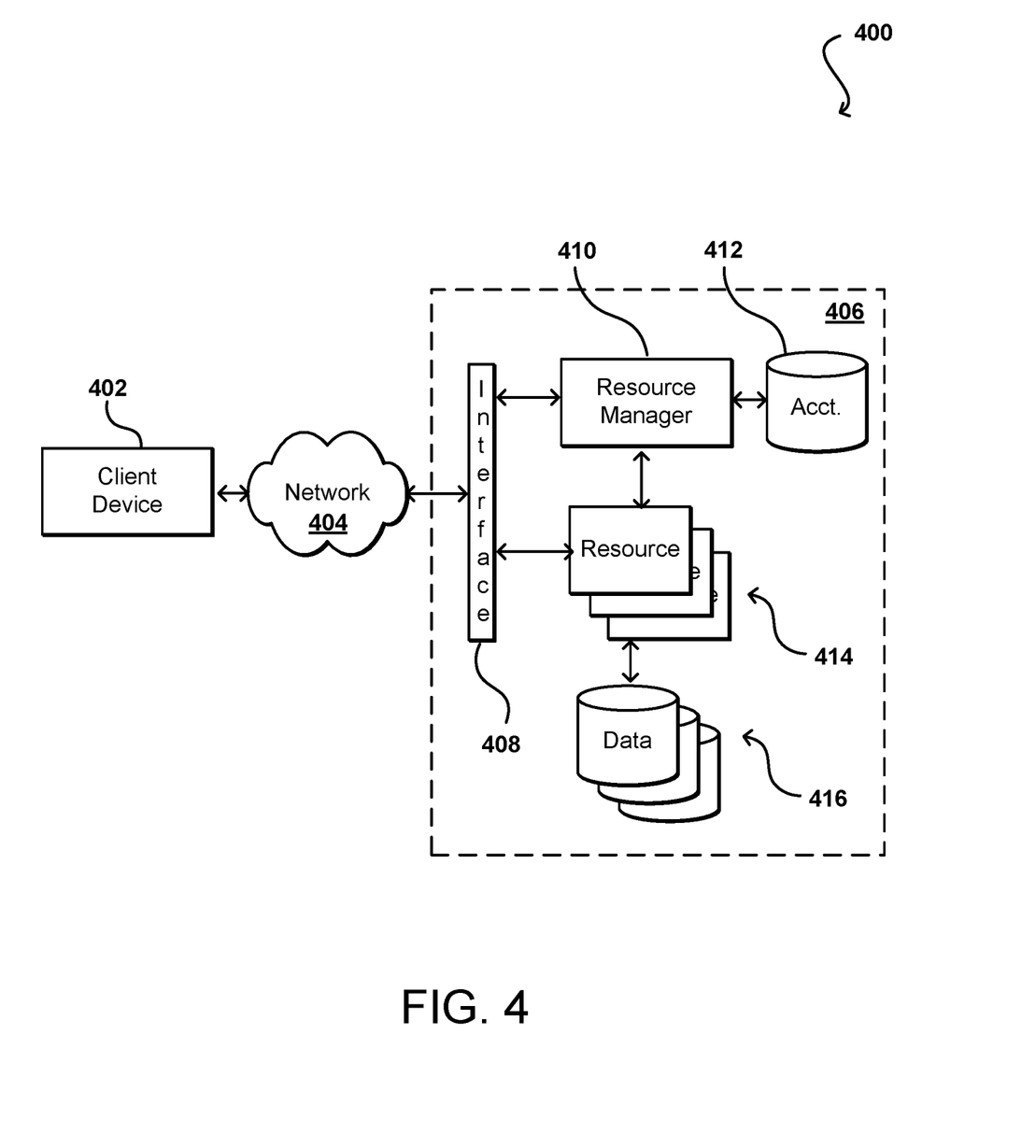
FIG. 4 illustrates an example environment in which various embodiments can be implemented.

FIG. 4 illustrates an example environment 400 in which aspects of the various embodiments can be implemented. In this example a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

An environment such as that described with respect to FIG. 4 can facilitate the handling of requests to execute tasks on code of a specified application using a virtual compute fleet by utilizing containers created on the virtual machine instances as compute capacity. Information for a request or event can be received to a load balancer 408 that can determine an appropriate resource fleet 410, 412 to which to direct the information. The decision can be based upon various types of information, as may include the context associated with the type of event or request. Upon receiving a request to execute code on a selected virtual compute fleet 410, 412, a frontend service 414, 422 associated with the virtual compute fleet can provide the information to an instance manager, which can direct the information to a virtual machine (VM) instance 418, 420, 426, 428 where a container on the instance can provide an execution environment for the registered function.

The client device 402 may utilize one or more user interfaces, command-line interfaces (CLIs), application programing interfaces (APIs), and/or other programmatic interfaces for generating and uploading customer code, invoking the customer code (e.g., submitting a request to execute the code on the virtual compute system), scheduling event-based jobs or timed jobs, tracking the customer code, and/or viewing other logging or monitoring information related to their requests and/or customer code. Although one or more embodiments may be described herein as using a user interface, it should be appreciated that such embodiments may, additionally or alternatively, use any CLIs, APIs, or other programmatic interfaces.

Figure 5:
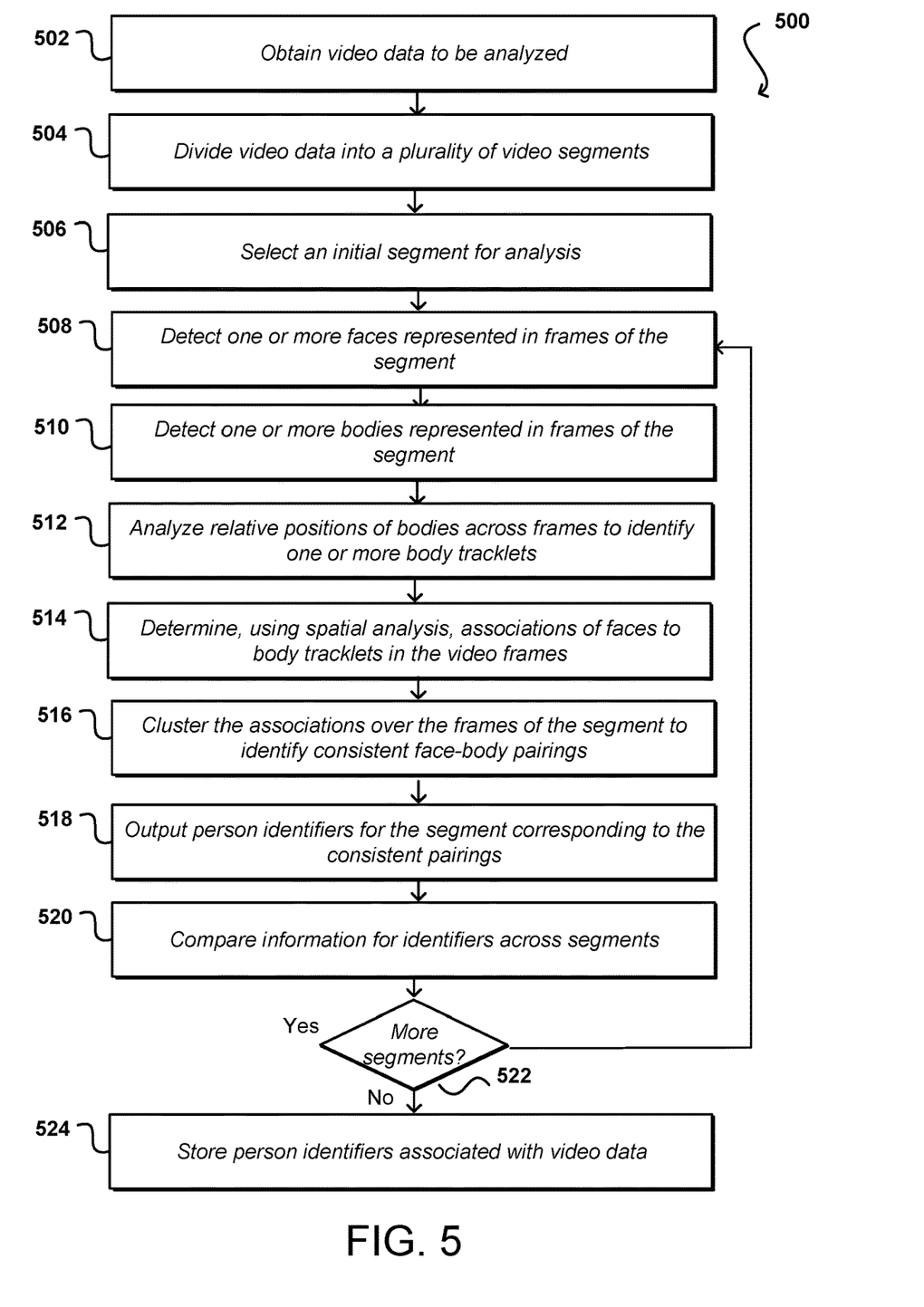
FIG. 5 illustrates an example process for identifying people represented in various segments of video content that can be utilized in accordance with various embodiments.

FIG. 5 illustrates an example process 500 for identifying people represented in video content that can be utilized in accordance with one embodiment. It should be understood for this and other processes discussed herein that there can be additional, alternative, or fewer steps performed in similar or alternative orders, or in parallel, within the scope of the various embodiments unless otherwise stated. In this example, video data is obtained 502 that is to be analyzed. The video data can be received from a source, such as in a feed or stream, or obtained from a local file repository, among other such options. The video data may have some identification or metadata included, or may be a video file of unknown content in various situations. In this example, the video data can be divided 504 into a plurality of video segments, which can be of substantially equal size or duration in some embodiments. The segments can be analyzed in sequence or at least partially in parallel. An initial segment can be selected 506 for analysis, and in some embodiments passed to parallel processing pipelines as discussed herein. For the segment, one or more faces can be detected 508 that are represented in one or more frames of the video segment. As mentioned, this can be performed using any of a number of face recognition, computer vision, or object detection algorithms discussed or suggested herein. One or more human bodies (or other face-related bodies) can also be detected 510 that are represented in the segment. Similar algorithms can be used for the body recognition as well, as may include object detection, computer vision, and the like. Machine learning and other approaches can be used as well as discussed herein. The relative positions of the bodies can be analyzed 512 across frames of the segment to identify one or more body tracklets, which identify not only a potentially unique body but also track its position consistently throughout at least a portion of the video segment.

Once a set of potential heads and body tracklets is identified, associations of the faces to the body tracklets can be determined using spatial analysis, among other options discussed herein. This can include, for example, determining distances between the faces and body tracklets in various frames and providing likelihood scores for the associations, wherein an association may have to have at least a minimum likelihood or certainty before being considered as a valid association. The relative position of the head and body in a frame can also be considered in addition to distance, considering placement limitations of the human body. The associations can then be clustered 516 over the frames of the segment to identify consistent face-body pairings in the segment. Person identifiers for each consistent pairing can then be output 518 to indicate the representation of a unique person represented in the video segment. The information for a segment can also be compared 520 across segments to determine if, for example, a person appears in multiple segments. In such instances, a longer multi-segment tracklet might be generated that includes tracking information across the various segments. If it is determined 522 that there are more segments to be analyzed then the process can continue. Once the segments for the video data are analyzed in this example, the person identifiers from the various segments can be stored 524 and associated with the video data.

Figure 6:
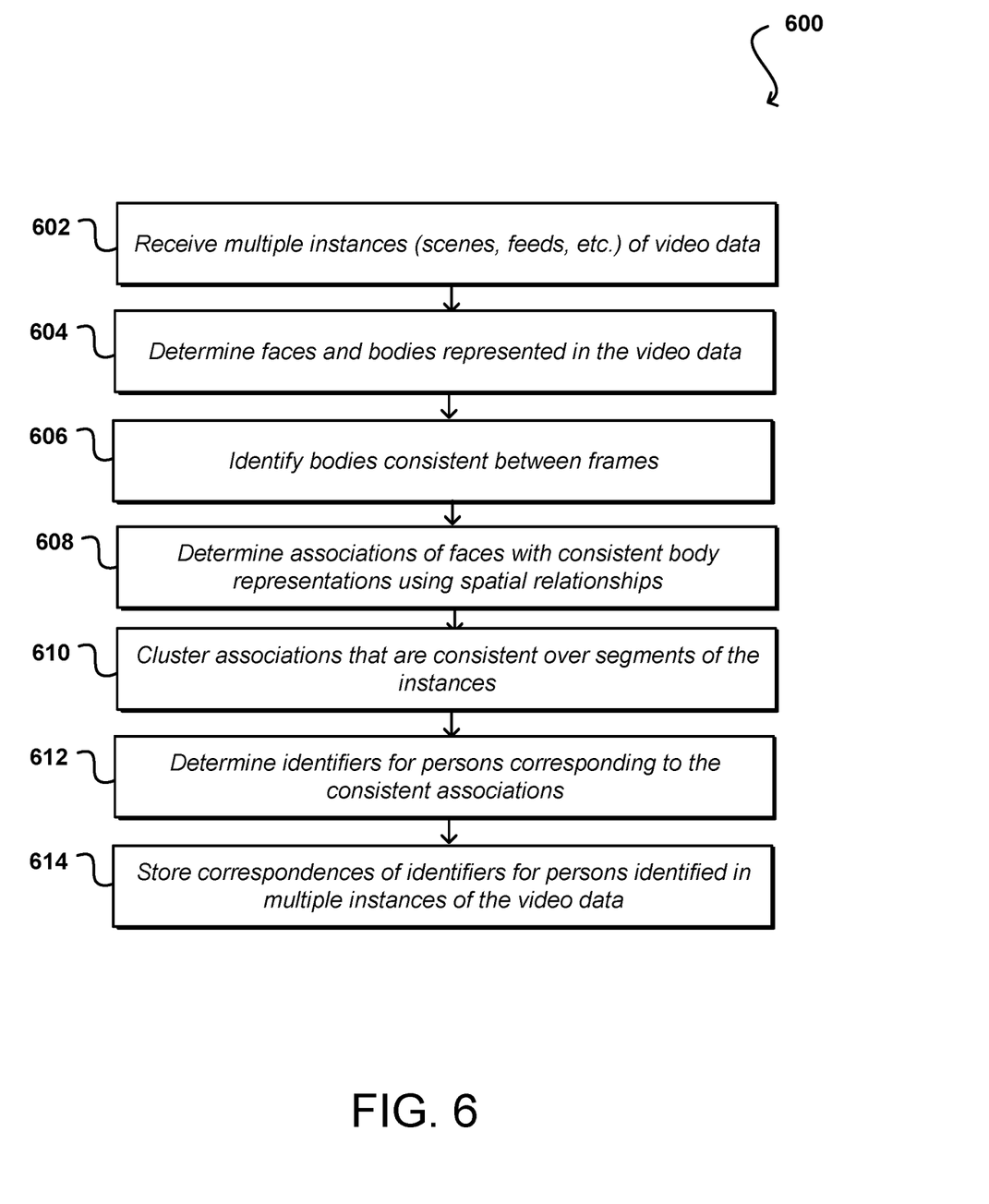
FIG. 6 illustrates an example process for identifying a presence of a person in a segment of video content that can be utilized in accordance with various embodiments.

FIG. 6 illustrates an example process 600 for recognizing people across multiple video instances that can be utilized in accordance with various embodiments. In this example, multiple instances of video data are received 602 or otherwise obtained. The instances can include various types of instances, such as different scenes or shots in a single video file or stream, different video files or streams, and the like. The video data can be analyzed using any of a number of different analysis techniques to determine 604 faces and bodies represented in the video data. The body representations can be analyzed to identify 606 bodies that are consistent between frames or other portions of the video data. This can include, for example, bodies that move along a reasonable path over a period of time in a single scene. Various associations of faces and consistent body representations can be determined 608, such as by determining various spatial relationships. Once a set of potential associations is determined, those associations can be clustered 610 that are consistent over segments of the instances, such as where a given face does not appear to be associated with two different bodies, but is consistently paired with the same body representation, or vice versa. Unique identifiers can be determined 612 for persons corresponding to the consistent associations. The correspondences of these identifiers for persons identified in multiple instances of the video data can then be stored 614 for subsequent analysis or use, such as to determine instances of video content that include representations of a specific person.

Figure 7:
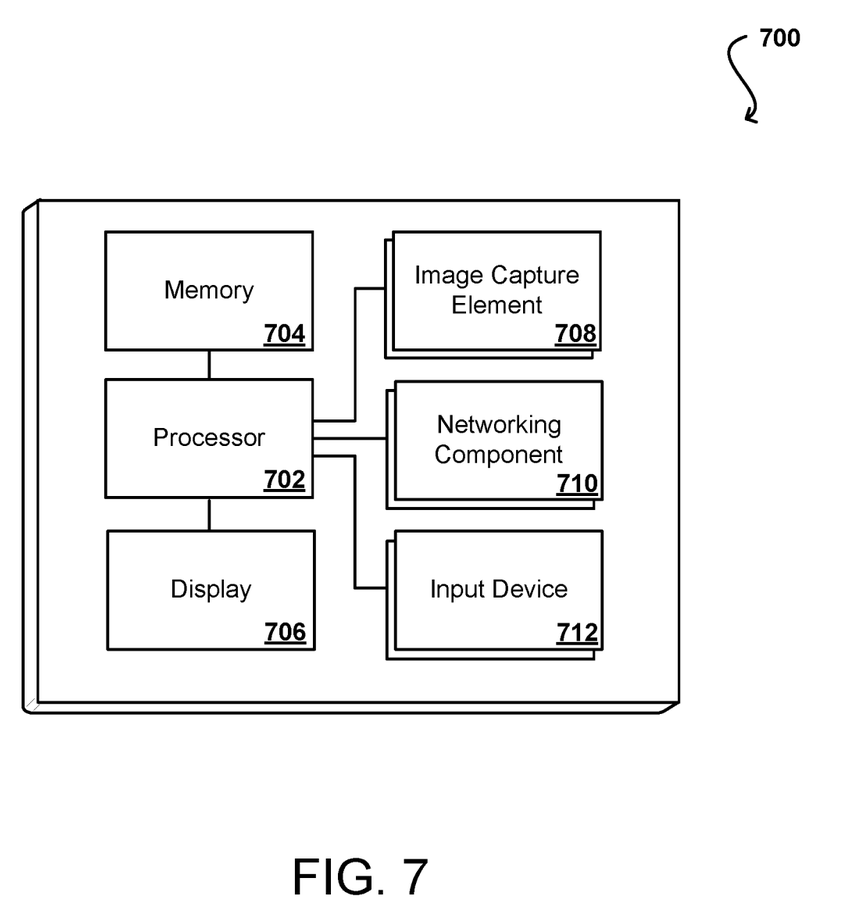
FIG. 7 illustrates example components of a computing device that can be used to implement aspects of the various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   dividing video data into a plurality of segments, the video data including multiple scenes of a single video feed or multiple video feeds;
   analyzing the segments to identify faces and bodies represented in the video data for the segments;
   analyzing the bodies represented over a length of individuals of the segments to generate one or more body tracklets for the respective segment;
   determining, based at least in part upon spatial relationships between individuals of the faces and individuals of the body tracklets in individual segments, potential associations of the faces and the body tracklets in the respective segment that satisfy a minimum association confidence;
   determining, using a clustering algorithm, at least a subset of the potential associations that satisfy a consistency criterion between a first segment and at least a second of the segments; and
   outputting unique identifiers for persons identified in the plurality of segments corresponding to the associations that satisfy the consistency criterion.

2. The computer-implemented method of claim 1, further comprising:
   generating a respective feature vector for each association of a face and body tracklet determined in a respective segment; and
   processing the feature vectors using the clustering algorithm to generate the subset of associations.

3. The computer-implemented method of claim 1, further comprising:
   analyzing the associations using the consistency criterion, the consistency criterion including at least one of a minimum amount of association, a minimum strength of association, or an incompatible association through one or more segments of the video data.

4. The computer-implemented method of claim 1, further comprising:
processing frames of the video data using a face recognition algorithm to generate a first set of bounding boxes indicating locations of faces recognized in the video data;
processing frames of the video data using a body recognition algorithm to generate a second set of bounding boxes indicating locations of bodies recognized in the video data; and
determining the associations of faces and the body tracklets based at least in part upon spatial relationships of bounding boxes of the first and second sets.

5. The computer-implemented method of claim 1, further comprising:
storing the unique identifiers to an identifier repository, wherein a respective unique identifier is associated with multiple instances of video data in which the corresponding person is identified.

6. A computer-implemented method, comprising:
identifying a plurality of faces and a plurality of bodies represented in a segment of video data;
determining a confidence score for individual pairs of faces and bodies based at least in part upon spatial relationships between individuals of the faces and individuals of body tracklets in individual segments;
determining, based on the confidence scores, that a face of the plurality of faces and a body of the plurality of bodies correspond to a single person with at least a minimum confidence;
determining that a correspondence of the face to the body satisfies a consistency criterion over a plurality of the segments of the video data based on the spatial relationship; and
outputting an identifier for a person associated with the face and the body detected in the segment.

7. The computer-implemented method of claim 6, further comprising:
analyzing a second segment of video data for a different scene of the video data or a second video data;
outputting the identifier for the person as detected in the second segment; and
storing an association of the identifier with the segment of video data and the second segment of video data.

8. The computer-implemented method of claim 6, further comprising:
obtaining a plurality of instances of video data; and
dividing the instances into a set of video segments including the segment of video data.

9. The computer-implemented method of claim 6, further comprising:
processing frames of the segment using a face recognition algorithm to identify at least the face represented in the frames.

10. The computer-implemented method of claim 6, further comprising:
processing frames of the segment using a body detection algorithm to identify at least the body represented in the frames.

11. The computer-implemented method of claim 10, further comprising:
determining, using an optical flow algorithm, a consistent path of motion of the body across at least a subset of frames of the segment to generate a body tracklet for the representation of the body.

12. The computer-implemented method of claim 11, further comprising:
determining an association of the face to the body tracklet using at least one of distance or spatial relationship in order to determine that the face and the body correspond to the single person.

13. The computer-implemented method of claim 12, further comprising:
determining that the correspondence of the face to the body satisfies the consistency criterion by performing clustering of the association over multiple frames of the segment.

14. The computer-implemented method of claim 6, further comprising:
storing an association of the segment with the identifier for the person in an identifier repository, the identifier capable of being associated with one or more other segments of video data in which a representation of the person was determined.

15. The computer-implemented method of claim 14, wherein the one or more other segments correspond to at least one of other scenes, feeds, files, or streams of video data.

16. A system, comprising:
at least one processor; and
memory including instructions that, when executed by the at least one processor, cause the system to:
identify a plurality of faces and a plurality of bodies represented in a segment of video data;
determine a confidence score for individual pairs of faces and bodies based at least in part upon spatial relationships between individuals of the faces and individuals of body tracklets in individual segments;
determine, based on the confidence scores, that a face of the plurality of faces and a body of the plurality of bodies correspond to a single person with at least a minimum confidence;
determine that a correspondence of the face to the body satisfies a consistency criterion over a plurality of the segments of the video data based on the spatial relationship; and
output an identifier for a person associated with the face and the body detected in the segment.

17. The system of claim 16, wherein the instructions when executed further cause the system to:
analyze a second segment of video data for a different scene of the video data or a second video data;
output the identifier for the person as detected in the second segment; and
store an association of the identifier with the segment of video data and the second segment of video data.

18. The system of claim 16, wherein the instructions when executed further cause the system to:
process frames of the segment using a face recognition algorithm to identify at least the face represented in the frames.

19. The system of claim 16, wherein the instructions when executed further cause the system to:
process frames of the segment using a body detection algorithm to identify at least the body represented in the frames;
determine, using an optical flow algorithm, a consistent path of motion of the body across at least a subset of frames of the segment to generate a body tracklet for the representation of the body; and
determine an association of the face to the body tracklet using at least one of distance or spatial relationship in order to determine that the face and the body correspond to the single person.

20. The system of claim 16, wherein the instructions when executed further cause the system to:
store an association of the segment with the identifier for the person in an identifier repository, the identifier capable of being associated with one or more other segments of video data in which a representation of the person was determined.

* * * * *